United States Patent
Martin

(10) Patent No.: US 10,328,990 B1
(45) Date of Patent: Jun. 25, 2019

(54) POWERED TRICYCLE AND GO-CART HAVING A COMMON MOTOR MOUNTING FRAME

(71) Applicant: Tracy Michael Martin, Anchorage, AK (US)

(72) Inventor: Tracy Michael Martin, Anchorage, AK (US)

(*) Notice: Subject to any disclaimer, the term of this patent is extended or adjusted under 35 U.S.C. 154(b) by 71 days.

(21) Appl. No.: 15/687,798

(22) Filed: Aug. 28, 2017

(51) Int. Cl.
| | |
|---|---|
| *B62K 13/08* | (2006.01) |
| *B62K 13/06* | (2006.01) |
| *B62K 5/027* | (2013.01) |
| *B62K 23/06* | (2006.01) |
| *B62L 3/02* | (2006.01) |

(52) U.S. Cl.
CPC ............ *B62K 13/08* (2013.01); *B62K 5/027* (2013.01); *B62K 13/06* (2013.01); *B62K 23/06* (2013.01); *B62L 3/02* (2013.01); *B60Y 2200/114* (2013.01)

(58) Field of Classification Search
CPC ... B62D 7/20; B62D 7/18; B60G 3/20; B60G 2200/144; B60G 2200/18; B60G 2204/421; B62K 13/04; B62K 13/06; B62K 13/08
USPC ...... 280/93.51; 180/208, 209, 220, 295, 299
See application file for complete search history.

(56) References Cited

U.S. PATENT DOCUMENTS

| | | | | |
|---|---|---|---|---|
| 6,749,039 B1* | 6/2004 | Uphaus | ............... | B60K 25/02 180/208 |
| 8,261,859 B2* | 9/2012 | Duehring | ............... | B62M 7/14 180/11 |
| 9,550,542 B2* | 1/2017 | Figueroa | ............... | B62K 15/00 |
| 9,688,340 B1* | 6/2017 | Kroymann | ............ | B62K 13/04 |
| 10,016,666 B2* | 7/2018 | Reimers | ............... | A63B 55/61 |
| 2005/0173180 A1* | 8/2005 | Hypes | ............... | B60K 17/16 180/292 |
| 2009/0184484 A1* | 7/2009 | Gerrard | ............... | B60G 3/10 280/124.144 |
| 2011/0155888 A1* | 6/2011 | Jordahl | ............... | A01B 73/00 248/647 |
| 2013/0257145 A1* | 10/2013 | Caldeira | ............... | B60L 3/0046 307/9.1 |

\* cited by examiner

*Primary Examiner* — Paul N Dickson
*Assistant Examiner* — Hilary L Johns
(74) *Attorney, Agent, or Firm* — Michael J. Tavella

(57) ABSTRACT

A go-cart frame and a tricycle frame that can be attached to an engine frame. Both the go-cart frame and tricycle frame have a mounting bracket that attaches to a bracket on the engine frame. The engine frame has an engine mount, a transmission system and two wheels. The go-cart frame has two wheels in the front, a front steering systems, a body with a seat and throttle and brake controls. The tricycle frame has a single front wheel, a steering system, a seat and throttle and brake controls. To convert one device to the other, the user simply unbolts the engine frame from the other frame (supporting it as needed), disconnects the control cables, moves the originally connected piece, moves the other piece into position, and then bolts this new piece to the engine frame and reconnects the controls. Then, the new configuration is ready to use.

9 Claims, 6 Drawing Sheets

POWERED TRICYCLE AND GO-CART HAVING A COMMON MOTOR MOUNTING FRAME

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the invention

This invention relates to powered tricycles and go-carts and particular for a powered tricycle and go-cart having a common motor mounting frame.

2. Description of the Prior Art

Powered go-carts have been around for many years. Powered tricycles have been as well. That said, each had been left to its own use. Over the years people have worked on tricycles in an attempt to convert them into different vehicle forms. For example, both U.S. Pat. Nos. 4,079,957 and 8,500,134 teach convertible tricycles. In U.S. Pat. No. 4,079,957 the conversion is from a tricycle with a high seat to a recumbent tricycle. In U.S. Pat. No. 8,500,134, the conversion is from a high seat tricycle to a three wheeled scooter. Nether of these patents teach a motorized device. U.S. Pat. No. 4,274,647 teaches a skateboard that can be converted to a four-wheeled skateboard with seats, or to a four-wheeled vehicle powered by pedals or an electric motor. Finally, U.S. Pat. No. 4,691,930 teaches a vehicle that has a front frame member with one wheel and a steering mechanism, a rear frame member with two wheels, and a center frame member with a seat or platform. Depending on how these frames are assembled, it is possible to make a high-seat tricycle, a low seat tricycle or a scooter. None of these devices is powered by an engine. All of the above devices center on either a skateboard or a tricycle frame. None teach a device that can convert a powered three-wheeled tricycle into a four wheel go-cart.

BRIEF DESCRIPTION OF THE INVENTION

The instant invention offers a user the ability to have a powered tricycle or go-cart using three frame components. The invention consists of a go-cart frame, an engine frame and a tricycle frame. Both the go-cart frame and tricycle frame have a mounting bracket that attaches to a bracket on the engine frame. The engine frame has an engine mount, a transmission system a brake, and two wheels. The go-cart frame has two wheels in the front, a front steering systems, a body with a seat and throttle and brake controls. The tricycle frame has a single front wheel, a steering system, a seat and throttle and brake controls. To convert one device to the other, the user simply unbolts the engine frame from the other frame (supporting it as needed), disconnects the control cables, moves the originally connected piece out of the way, moves the other piece into position, and then bolts this new piece to the engine frame and reconnects the controls. Then, the new configuration is ready to use.

DETAILED DESCRIPTION OF THE INVENTION

Figure 1:
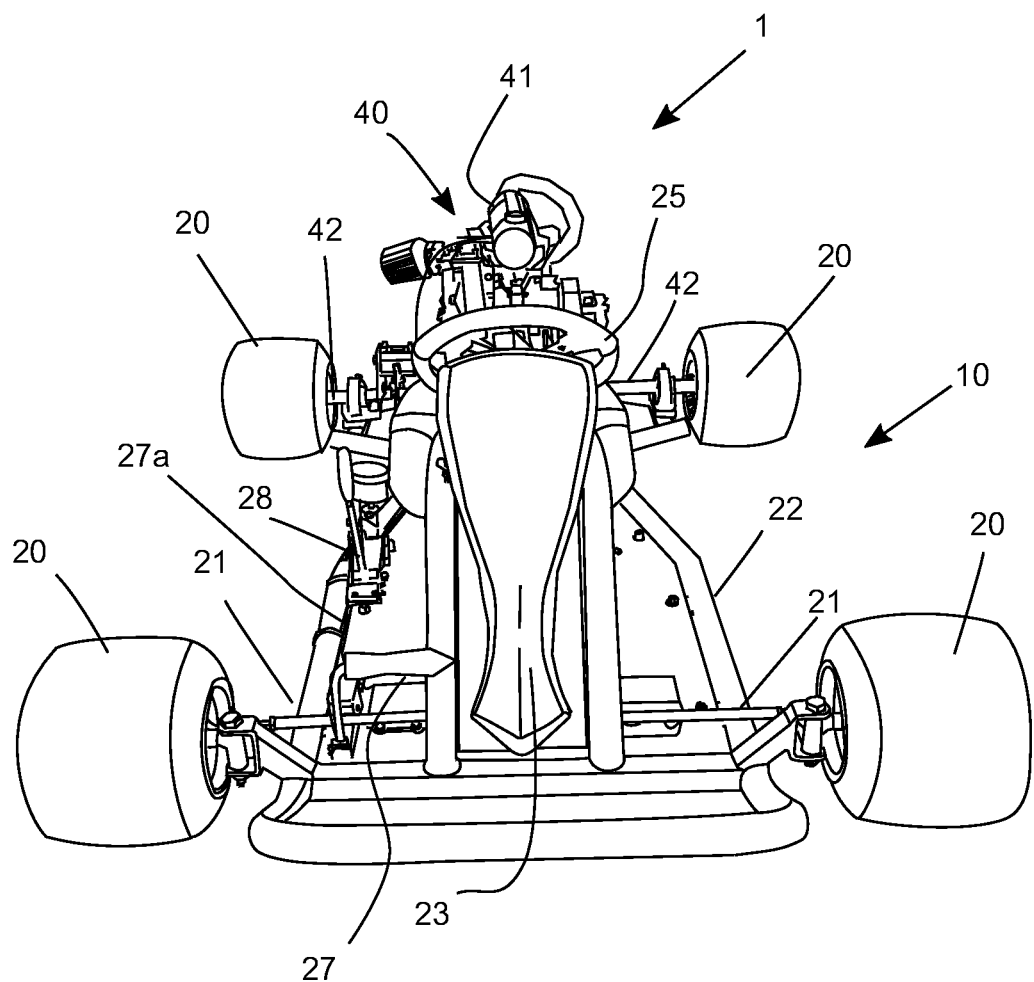
FIG. 1 is a front view of the device as a go-cart.
Figure 2:
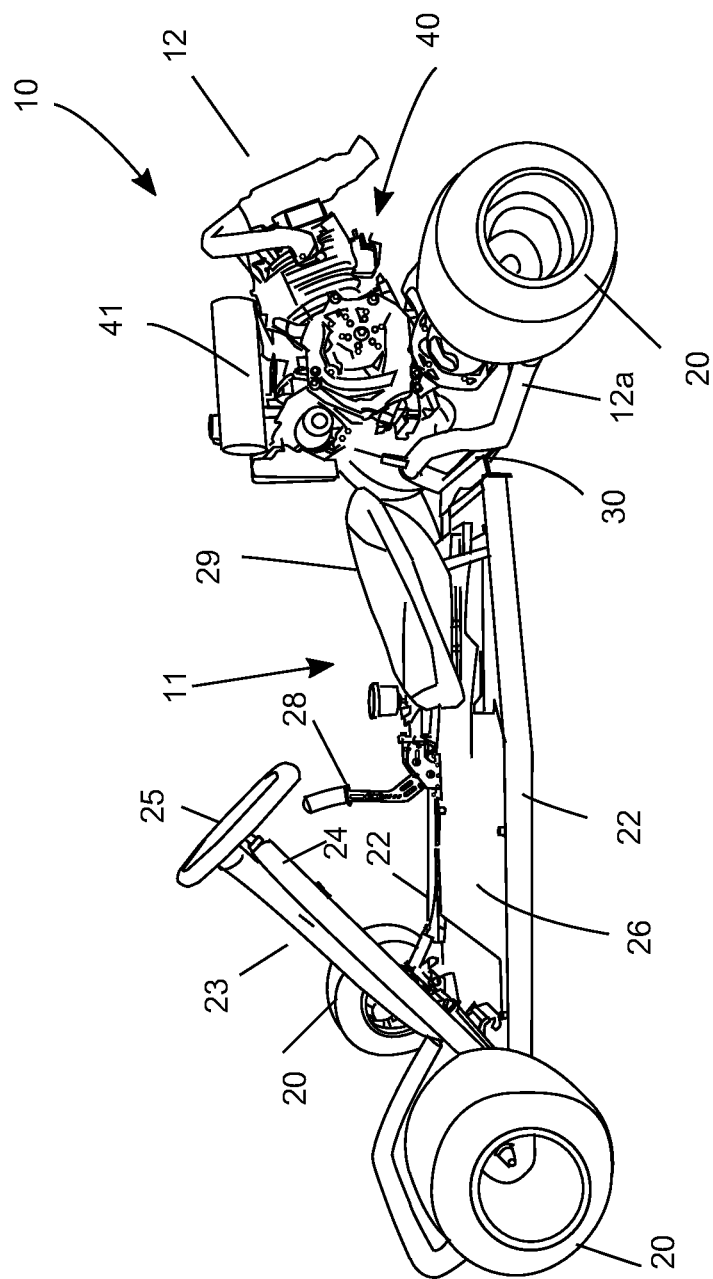
FIG. 2 is a side view of the device as a go-cart.

Referring now to the drawings, and particularly FIG. 1, a front view of the device 1 as a go-cart 10 is shown. FIG. 2 is a side view of the go-cart 10. The device 1 in the go-cart 10 mode has a forward, go-cart module 11, and an engine/drive module 12. As discussed below, the go-cart module 11 and the tricycle module 51 (see FIG. 3) connect to the engine/drive module 11 to form a complete vehicle or device 1.

Figure 3:
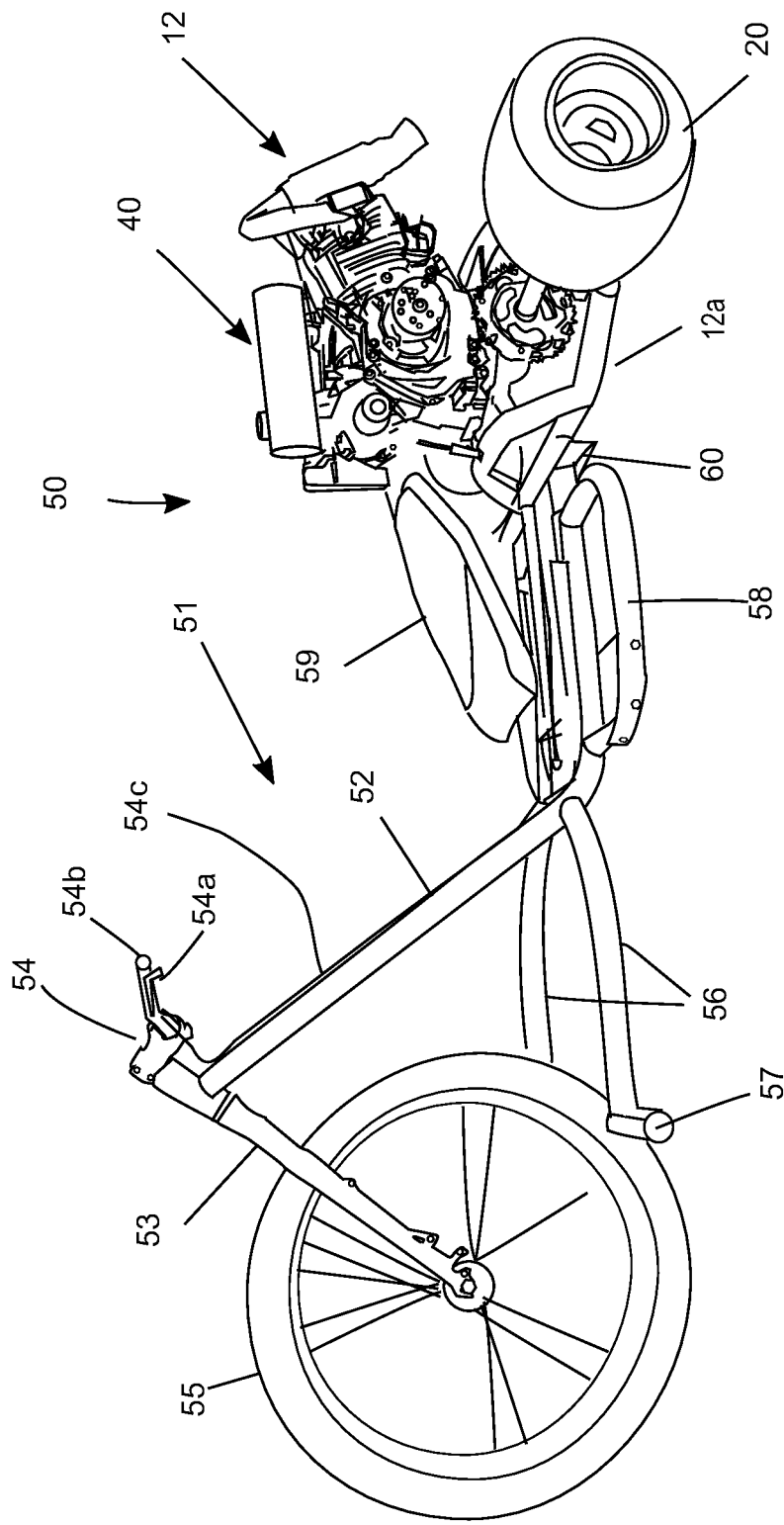
FIG. 3 is a side view of the device as a powered tricycle.

In the case of the go-cart 10, the forward go-cart module 11 has a pair of wheels 20 connected to a front axle and steering system 21. These are connected to a front frame 22 that has side rails and braces as shown. A front cowling 23 is attached to steering column 24, which is attached to the steering system 21 in an ordinary manner for use. A steering wheel 25 is attached to the steering column 24 as shown. Behind the steering column 24 is a spacer plate 26 to which throttle pedal 27 and a break lever 28 are installed. Cables 27a are run from the throttle and brake to the engine/drive module 12 in the standard manner. The spacer plate 26 also fills the gap between the steering column 24 and a seat 29 as shown. Behind the seat 29 is an attachment plate 30 for the forward go-cart module 11. Note that the tricycle module 51 has a similar attachment plate 60, as discussed below. This attachment plate 60 is shown in FIG. 3 and is the same structurally as the plate 30, shown in detail in FIG. 6.

The engine/drive module 12 has a base frame 12a (see FIGS. 4 and 5 below) onto which an engine 40 is mounted. The engine is a typical self-contained go-cart engine. In the preferred embodiment, the engine is a Predator Engine sized at either 212 cc or 420 cc.

Predator engines are commercially available from a variety of sources. All through not preferred, many other similar small engines can be used as well.

This engine has a fuel tank 41 mounted to it as shown. Throttle cables 27a (see FIG. 1) are run from the throttle 27 to the engine and are disconnected when the forward go-cart module 11 is removed. Note too that the engine/drive module 12 also has a pair of wheels 20 mounted to an axle 42 that has a transmission (sprocket), which is attached to the engine. The engine and transmission make up a drive mechanism. This is shown in FIGS. 4 and 5 below.

FIG. 3 is a side view of the device as a powered tricycle 50. This vehicle consists of a forward trike module 51 and the engine/drive module 12. The engine/drive module 12 is the same as discussed above (and below). It is attached to the rear of the trike module 51 as discussed below. The trike module 51 has a frame 52 that has a front fork 53 and handlebars 54 that are used to turn the front wheels 55 in a normal manner consistent with other types of bikes. The frame 52 has a front extension 56 with foot pegs 57 and a rear frame portion 58 with a seat 59. As mentioned above, the trike module 51 has an attachment section 60 located behind the seat 59. The trike has a brake lever 54a and a throttle 54b mounted on the handlebars as is common in the powered bike are. In the preferred embodiment, the trike also has a front brake (not shown), which is operated in the normal manner. Not too that the brake lever and throttle can be placed on either side of the handlebars, as desired. As in the case of the go-cart, cables 54c are run from the controls back to the engine module and are connected accordingly.

Figure 4:
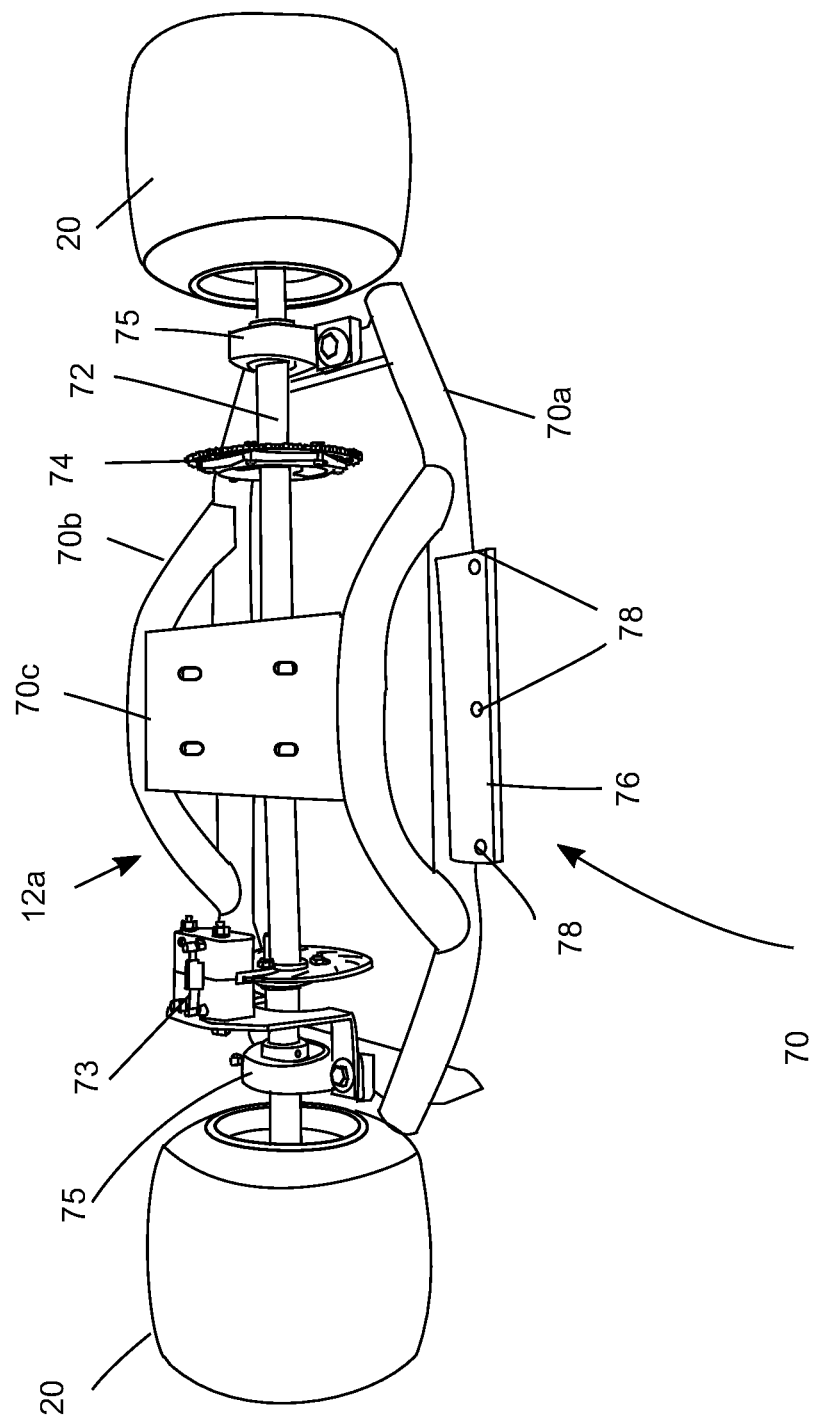
FIG. 4 is a top view of the engine/drive module frame with the engine removed showing some of the transmission parts.
Figure 5:
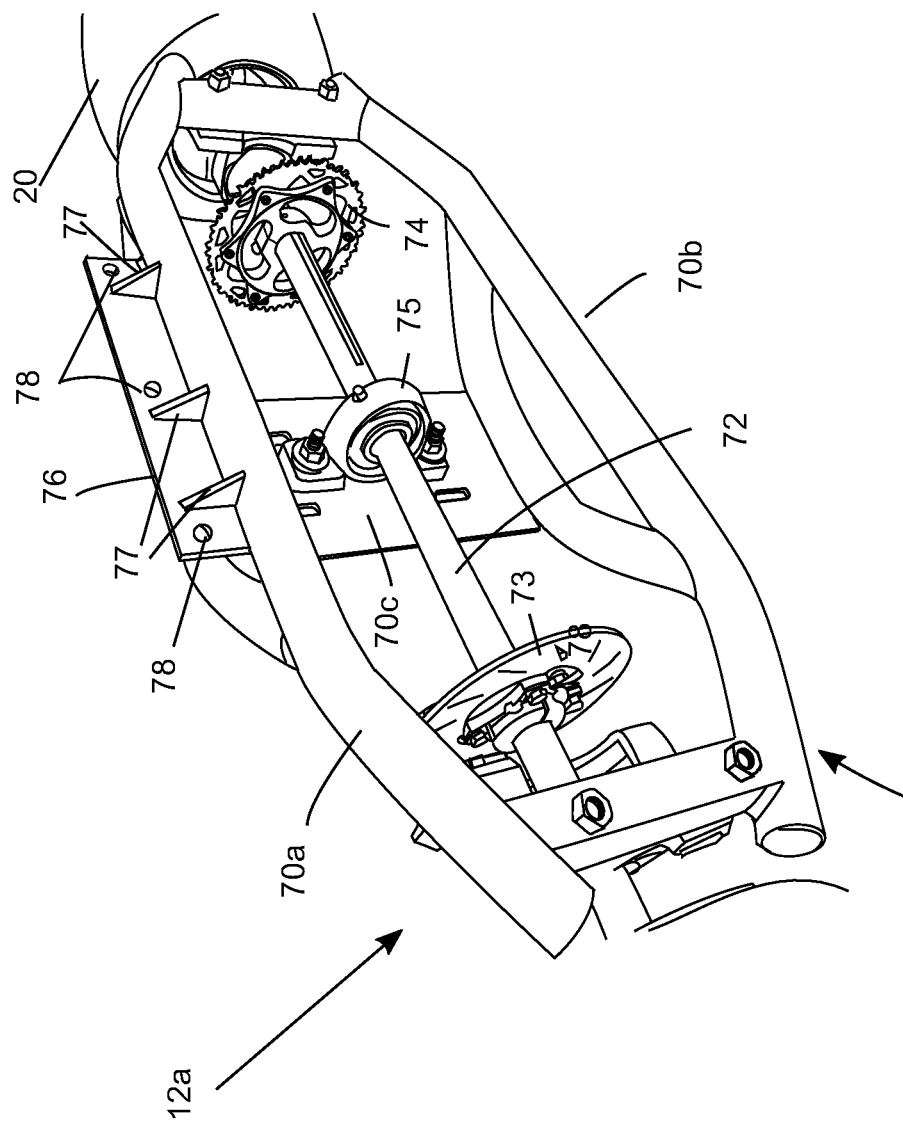
FIG. 5 is a bottom perspective view of the engine frame showing the rear axle and transmission parts.

FIG. 4 is a top view of the engine/drive module frame 12a with the engine removed showing some of the transmission parts. FIG. 5 is a bottom perspective view of the engine/drive module frame 12a frame showing the rear axle, the break disk 73 and the sprocket 74. The engine/drive module frame 12a consists of a base frame 70, a pair of rear wheels 20, an axle 72, a brake system 73, a drive sprocket 74 and bearings 75. The drive sprocket 74 is attached to the engine using a chain (not shown). Any standard chain, such as a number 35 chain can be used.

The base frame 70 has a front portion 70a and a rear portion 70b and an engine mount plate 70c. In the preferred embodiment, all of these parts are welded. The engine mount plate 70c has four holes that allow the engine to be bolted to it. The placement of those holes is such that it can be used as a universal bracket in that many small engines can be bolted directly to the engine mounting plate as installed on the engine/drive module frame 12a.

Located on the front portion 70a of the base frame 70 is an attachment plate 76. This attachment plate is used to attach the engine/drive module 12 to either the go-cart module 11 or the forward trike module 51, as discussed below. Note that FIG. 5 shows a bearing 75 also mounted beneath the engine mount plate 70c. FIG. 5 also shows the bottom of the attachment plate 76. Note that the attachment plate is reinforced with gussets 77 as shown. The attachment plate 77 has three holes 78 that are used to bolt the engine/drive module frame 12a to the attachment section 30 on the go-cart or the attachment section 60 on the trike.

Figure 6:
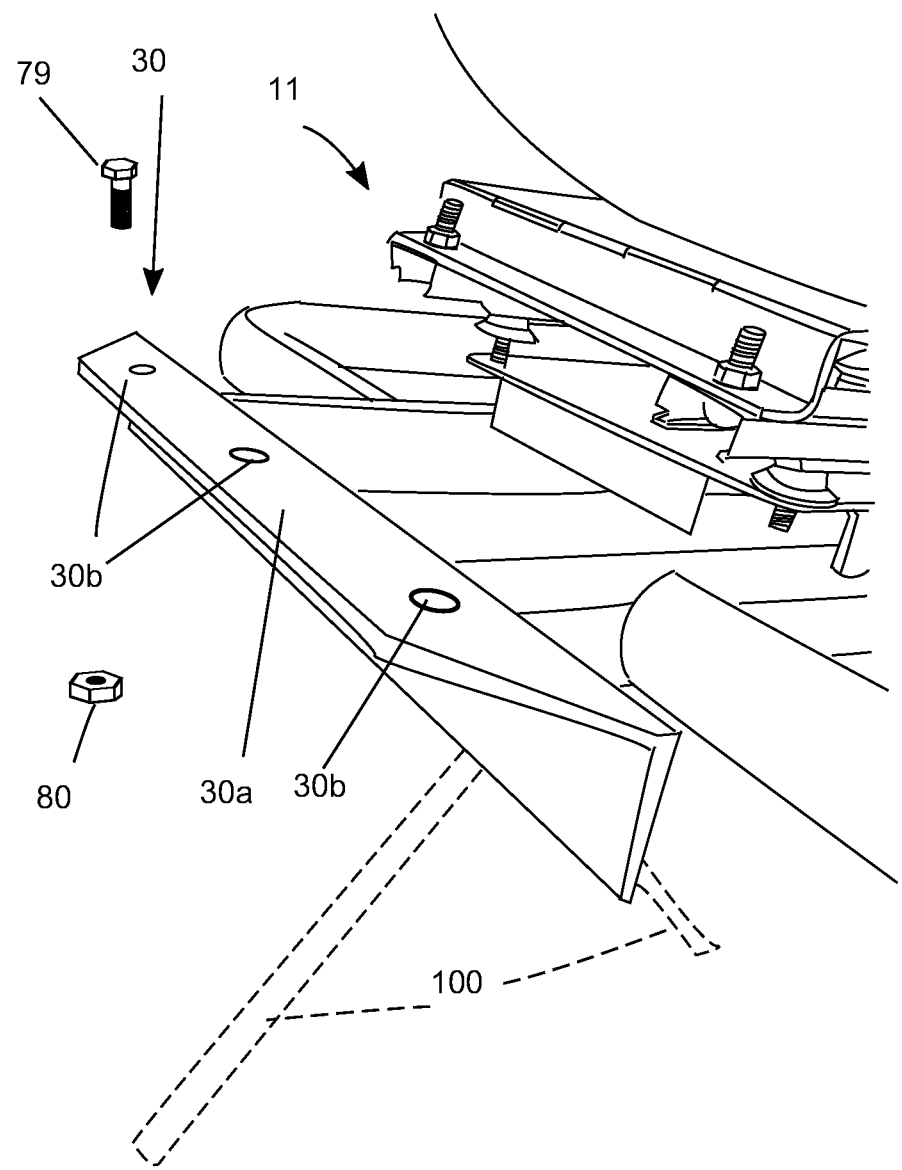
FIG. 6 is a detail view of the rear of the go-cart frame showing the mounting bracket.

FIG. 6 is a detail view of the rear of the go-cart frame showing the attachment section 30. Assembly is the same for both vehicles. Note that FIG. 6 shows temporary supports 100. These are used to elevate the attachment section 30 above the ground to make to attachment easier. Any type of temporary support can be used. It is also possible to simply lift the engine drive frame and bolt it to one of the other modules. Note that the attachment section 30 consists of a flange 30a made of angle material. Three holes 30b are provided to attach the go-cart to the engine/drive module 12 To assemble the two parts, the user slides the engine module attachment plate 30 under the flange 30a of the attachment section 30. Then bolts 79 are inserted through both the holes 30b and 78. These are secured with nuts 80, which are the fastening means to attach the engine module to the go-cart or trike modules. Once the bolts are tight and secure, the two modules are locked together and are ready to use.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A powered tricycle and go-cart having a common motor mounting frame comprising: a) a go-cart module, having a seat, a steering mechanism, two front wheels, and an attachment plate having at least one hole; b) a tricycle module, having a seat, a steering mechanism, one front wheel, and an attachment plate having at least one hole; and c) an engine module, having a frame, an engine mount, an axle, two wheels attached to said axle, a drive mechanism, and an attachment plate having at least one hole; d) whereby a go-cart is formed when said go-cart module attachment plate is attached to said engine module attachment plate; and further wherein e) a powered tricycle is formed when said tricycle module attachment plate is attached to said engine module attachment plate.

2. The powered tricycle and go-cart of claim 1 wherein said attachment plates on said engine module and said tricycle module are secured by mechanical fasteners, and further wherein said attachment plates on said engine module and said go cart module are secured by mechanical fasteners.

3. The powered tricycle and go-cart of claim 1 further comprising a brake attached to said axle on said engine module.

4. The powered tricycle and go-cart of claim 3 further comprising:
   a) a brake control, installed on said go-cart module;
   b) a connection device attached to said brake control on said go-cart module and to said brake on said axle of said engine module;
   c) a brake control, installed on said tricycle module;
   b) a connection device attached to said brake control on said tricycle module and to said brake on said axle of said engine module.

5. The powered tricycle and go-cart of claim 1 further comprising a throttle attached to an engine installed on said engine mount on said engine module.

6. The powered tricycle and go-cart of claim 5 further comprising:
   a) a throttle control installed on said go-cart module;
   b) a connection device attached to said throttle control on said go-cart module and to said throttle on said engine on said engine module;
   c) a throttle control installed on said tricycle module;
   b) a connection device attached to said throttle control on said tricycle module and to said throttle on said engine on said engine module.

7. A method of assembling a powered go-cart comprising the steps of:
   a) positioning a go-cart module having a go-cart module, having a seat, a steering mechanism, two front wheels, and an attachment plate in front of an engine module, wherein said engine module has a frame, an engine mount, an axle, two wheels attached to said axle, a drive mechanism, and an attachment plate;
   b) aligning said attachment plate on said go-cart module and said attachment plate on said engine module;
   c) sliding said attachment plate on said go-cart module over said attachment plate on said engine module; and
   d) fastening said attachment plate on said go-cart module and said attachment plate on said engine module together.

8. The method of claim 7 wherein the attachment plate on the go-cart module and the attachment plate on the engine module each have at least two holes formed in them.

9. The method of claim 8 further comprising the steps of:
   a) after sliding said attachment plate on said go-cart module over said attachment plate on said engine module, inserting a bolt in each of the holes formed in the attachment plate on the go-cart module and the attachment plate on the engine module;
   b) attaching a nut onto each of said bolts; and c) tightening said nuts on said bolts until the attachment plate on the go-cart module and the attachment plate on the engine module are securely fastened.

\* \* \* \* \*